(12) United States Patent
Wille et al.

(10) Patent No.: US 10,725,202 B2
(45) Date of Patent: Jul. 28, 2020

(54) DOWNHOLE ELECTRONICS PACKAGE HAVING INTEGRATED COMPONENTS FORMED BY LAYER DEPOSITION

(71) Applicant: Baker Hughes, a GE company, LLC, Houston, TX (US)

(72) Inventors: Christian Wille, Burgdorf (DE);
Matthias C. Wahlen, Burgdorf (DE);
Peter Rottengatter, Celle (DE);
Mathias Kloock, Celle (DE);
Sven-Hendrik Joerns, Winsen (DE)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

(21) Appl. No.: 15/656,851

(22) Filed: Jul. 21, 2017

(65) Prior Publication Data
US 2019/0025458 A1    Jan. 24, 2019

(51) Int. Cl.
*G01V 11/00* (2006.01)
*E21B 47/00* (2012.01)
*E21B 47/06* (2012.01)

(52) U.S. Cl.
CPC ........ *G01V 11/002* (2013.01); *E21B 47/0006* (2013.01); *E21B 47/06* (2013.01); *E21B 47/065* (2013.01)

(58) Field of Classification Search
CPC ... G01V 11/002; E21B 47/0006; E21B 47/06; E21B 47/065
See application file for complete search history.

(56) References Cited

U.S. PATENT DOCUMENTS

| | | | | |
|---|---|---|---|---|
| 3,309,656 A | * | 3/1967 | Godbey | E21B 47/06 324/323 |
| 3,437,992 A | * | 4/1969 | Johnston | E21B 41/0085 340/854.4 |
| 3,900,827 A | * | 8/1975 | Lamel | E21B 47/16 166/113 |
| 3,982,224 A | * | 9/1976 | Patton | E21B 47/18 367/84 |

(Continued)

FOREIGN PATENT DOCUMENTS

WO    WO2015148901 A1    10/2015

OTHER PUBLICATIONS

Hammond, Frank et al., 'Printing Strain Gauges on Surgical Instruments for Force Measurement, Transactions of the SME, 030935-2/ vol. 8, Sep. 2014.

(Continued)

*Primary Examiner* — David J Bolduc
(74) *Attorney, Agent, or Firm* — Mossman Kumar & Tyler PC

(57) ABSTRACT

An apparatus for use in a wellbore may include a transducing element transducing a first property into a second property, a sensing element generating a signal in response to the second property, a layer deposited on the transducing element and defining a track, and an active electronic component. The sensing element is fixedly connected to the transducing element. The active electronic component is fixedly connected to the transducing element and is in communication with the sensing element via the track. A related method forms a downhole tool with the apparatus and operates the downhole tool in the wellbore.

20 Claims, 4 Drawing Sheets

(56) References Cited

U.S. PATENT DOCUMENTS

| | | | | |
|---|---|---|---|---|
| 4,562,375 | A * | 12/1985 | Besson | G01L 9/0022 310/338 |
| 4,577,510 | A * | 3/1986 | Bur | G01L 9/0001 374/143 |
| 4,660,638 | A * | 4/1987 | Yates, Jr. | E21B 43/11857 166/250.09 |
| 5,192,938 | A * | 3/1993 | Ort | G01B 7/20 338/3 |
| 5,406,482 | A * | 4/1995 | McCoy | E21B 43/127 417/63 |
| 5,464,058 | A * | 11/1995 | McCoy | E21B 47/0008 166/250.01 |
| 5,568,815 | A * | 10/1996 | Raynes | A61B 5/0215 600/485 |
| 6,360,615 | B1 * | 3/2002 | Smela | A61B 5/1124 73/862.474 |
| 6,466,513 | B1 | 10/2002 | Pabon et al. | |
| 7,355,321 | B2 * | 4/2008 | Yamashita | G01P 15/09 310/314 |
| 2002/0121132 | A1 * | 9/2002 | Breed | B60C 11/24 73/146 |
| 2002/0180605 | A1 * | 12/2002 | Ozguz | H01L 21/6836 340/573.1 |
| 2004/0016995 | A1 * | 1/2004 | Kuo | B81C 1/0023 257/678 |
| 2004/0200613 | A1 * | 10/2004 | Fripp | E21B 47/0006 166/250.01 |
| 2005/0000279 | A1 | 1/2005 | Yogeswaren | |
| 2005/0021247 | A1 * | 1/2005 | Liu | G01F 1/28 702/42 |
| 2005/0024231 | A1 * | 2/2005 | Fincher | E21B 17/028 340/854.4 |
| 2005/0152219 | A1 | 7/2005 | Garcia-Osuna | |
| 2005/0160814 | A1 * | 7/2005 | Vaganov | G01P 15/123 73/514.01 |
| 2005/0207279 | A1 * | 9/2005 | Chemali | E21B 17/028 367/83 |
| 2006/0113537 | A1 * | 6/2006 | Krulevitch | B81C 1/0023 257/57 |
| 2006/0144154 | A1 * | 7/2006 | Ueno | G01L 1/16 73/723 |
| 2006/0231622 | A1 * | 10/2006 | Kieffer | G01L 5/0047 235/449 |
| 2006/0267202 | A1 * | 11/2006 | Matsuzaki | H01L 23/5225 257/758 |
| 2007/0094862 | A1 * | 5/2007 | Posamentier | G06K 19/045 29/601 |
| 2008/0030205 | A1 * | 2/2008 | Fujii | B81B 7/02 324/661 |
| 2008/0037369 | A1 * | 2/2008 | Hentati | G01V 11/002 367/83 |
| 2008/0127727 | A1 * | 6/2008 | Brunner | G01D 3/0365 73/514.34 |
| 2008/0180242 | A1 * | 7/2008 | Cottingham | G06K 19/0723 340/539.12 |
| 2009/0108382 | A1 | 4/2009 | Eriksen | |
| 2009/0179523 | A1 * | 7/2009 | Wang | B82Y 10/00 310/338 |
| 2010/0013663 | A1 * | 1/2010 | Cavender | G01V 11/002 340/854.3 |
| 2010/0245114 | A1 * | 9/2010 | Celik-Butler | G01D 11/245 340/8.1 |
| 2010/0288157 | A1 * | 11/2010 | LeFebvre | B61F 5/305 105/218.1 |
| 2010/0331682 | A1 | 12/2010 | Stein et al. | |
| 2011/0036180 | A1 * | 2/2011 | Cesare | G01L 5/042 73/862.42 |
| 2013/0220701 | A1 * | 8/2013 | Crowley | E21B 17/073 175/40 |
| 2013/0222115 | A1 * | 8/2013 | Davoodi | H04Q 9/00 340/10.1 |
| 2013/0298642 | A1 * | 11/2013 | Gillette, II | H02J 50/00 73/31.01 |
| 2014/0000877 | A1 * | 1/2014 | Robertson | E21B 23/00 166/250.15 |
| 2014/0013852 | A1 * | 1/2014 | Brown | G01L 19/0092 73/714 |
| 2015/0027723 | A1 * | 1/2015 | Fripp | E21B 34/063 166/373 |
| 2015/0107852 | A1 * | 4/2015 | Southgate | E21B 47/01 166/378 |
| 2015/0142319 | A1 * | 5/2015 | McCoy | E21B 47/0007 702/9 |
| 2016/0024913 | A1 * | 1/2016 | Camwell | E21B 47/16 367/82 |
| 2016/0108720 | A1 * | 4/2016 | Teowee | E21B 47/06 73/1.15 |
| 2016/0341759 | A1 * | 11/2016 | Yamaji | G01P 15/0802 |
| 2017/0205533 | A1 * | 7/2017 | Li | G01V 11/002 |

OTHER PUBLICATIONS

International Search Report in PCT/US2018/042732, dated Nov. 6, 2018.

* cited by examiner

DOWNHOLE ELECTRONICS PACKAGE HAVING INTEGRATED COMPONENTS FORMED BY LAYER DEPOSITION

FIELD OF THE DISCLOSURE

This disclosure pertains generally to compact and robust electronics for downhole uses.

BACKGROUND OF THE DISCLOSURE

Exploration and production of hydrocarbons generally requires the use of various tools that are lowered into a borehole, such as drilling assemblies, measurement tools, and production devices (e.g., fracturing tools). Electronic components may be disposed downhole for various purposes, such as control of downhole tools, communication with the surface, and storage and analysis of data. Traditional printed circuit boards are one such type of electronic components. A printed circuit board (PCB) is a plate or board comprising a substrate supporting different elements that make up an electrical circuit that contains the electrical interconnections between them. The substrate is typically made from epoxy resin. As another example, a multi-chip module (MCM) is an electronic assembly with a number of conductor terminals or "pins" where multiple integrated circuits (ICs or "chips"), semiconductor dies and/or other discrete components are integrated, usually onto a unifying substrate, so that in use it is treated as if it were a single component. Other terms, such as "hybrid" or "hybrid integrated circuit", also refer to MCMs.

The size and cost of making PCB's is one factor that inhibits the efficient use of such electronics in downhole tools. In aspects, the present disclosure addresses the need for enhanced, more compact, and robust electronic components for downhole applications.

SUMMARY OF THE DISCLOSURE

In aspects, the present disclosure provides an apparatus for use in a wellbore. The apparatus may include a transducing element, a sensing element, at least one layer, and at least one active electronic component. The transducing element transduces a first property into a second property. The sensing element generates a signal in response to the second property and is fixedly connected to the transducing element. In one embodiment, the sensing element is connected to the transducing element without any flexible connection. The at least one layer is deposited on the transducing element and defines at least one track. The at least one active electronic component is fixedly connected to the transducing element and is in communication with the sensing element via the at least one track. In one embodiment, the active electronic component is connected to the transducing element without any flexible connection.

In aspects, the present disclosure provides a method for using an apparatus in a wellbore. The method includes forming a downhole tool that includes the above described apparatus, conveying the downhole tool into the wellbore; and operating the downhole tool in the wellbore.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

In aspects, the present application provides devices that can minimize the space needed for downhole electronics, such as sensors and related electronics. Electronics packages according to some embodiments do not use a PCB or ceramic mounting structure or wiring. The tracks connecting the sensor elements and its electronic or optic circuitry may be produced in a few or even only one manufacturing step by depositing one or more layers on a substrate. To better understand the teachings of the present disclosure, there is described below a drilling system in which devices according to the present disclosure may be used.

Figure 1:
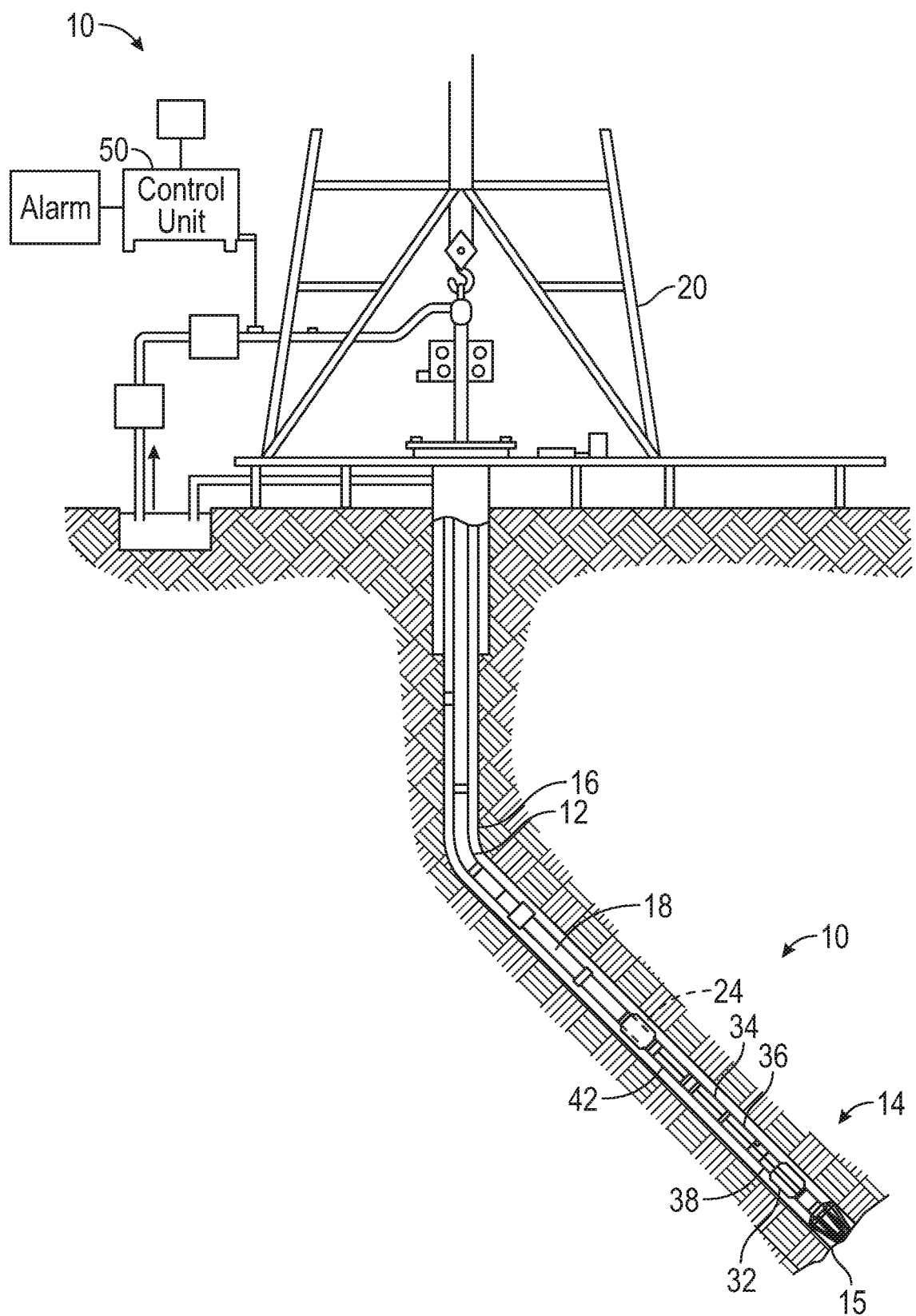
FIG. 1 shows a schematic of a well system that may use one or more electronic packages according to the present disclosure.

Referring now to FIG. 1, there is shown one illustrative embodiment of a drilling system 10 utilizing a borehole string 12 that may include a bottomhole assembly (BHA) 14 for directionally drilling a borehole 16. While a land-based rig is shown, these concepts and the methods are equally applicable to offshore drilling systems. The borehole string 12 may be suspended from a rig 20 and may include jointed tubulars or coiled tubing. In one configuration, the BHA 14 may include downhole tools such as a drill bit 15, a sensor sub 32, a power and/or communication module such as a bidirectional communication and power module (BCPM) 34, a formation evaluation (FE) sub 36, and rotary power devices such as drilling motors 38. The sensor sub 32 may include sensors for measuring near-bit direction (e.g., BHA azimuth and inclination, BHA coordinates, etc.) and sensors and tools for making rotary directional surveys. The formation evaluation (FE) sub 36 may include sensors to measure properties of the formation, such as nuclear tools, resistivity tools, acoustic tools, NMR tools. The borehole string 12 may further include sensors to measure the dynamic properties of the drilling process such as weight, torque, rate of penetration, rotational velocity, vibration, acceleration, force, strain, bending and the like that are useful to monitor and/or control the drilling process. The system may also include information processing devices such as a surface controller 50 and/or a downhole controller 42. Communication between the surface and the BHA 14 may use uplinks and/or downlinks that may be generated by a mud-driven alternator, a mud pulser, an electromagnetic transmitter, an acoustic transmitter and/or conveyed via the mud, hard wires (e.g., electrical conductors, fiber optics), the formation, the borehole, or the borehole string 12. The uplinks and/or downlinks may comprise pressure pulses, electric signals, acoustic signals, or electromagnetic signals or a combination thereof. One or more electronics packages may be used within the BHA 14 or other component of the borehole string 12 to provide for data storage and processing, communication and/or control functions.

Figure 2:
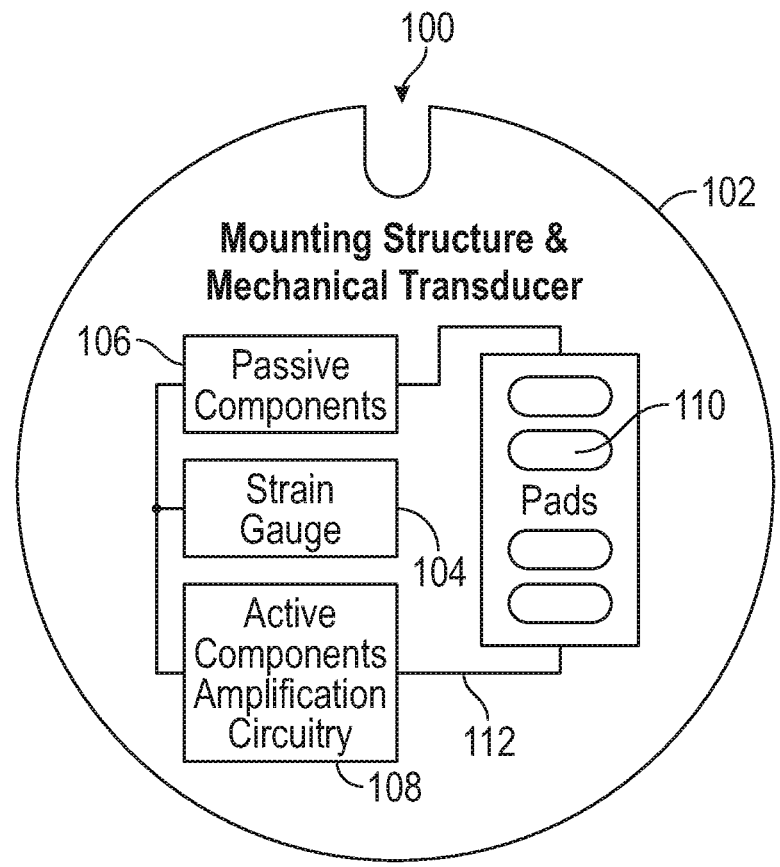
FIG. 2 illustrates one embodiment of an electronics package according to the present disclosure.

Referring to FIG. 2, there is shown one non-limiting embodiment of an electronics package 100 that may be used with the drilling system 10 of FIG. 1. In one non-limiting embodiment, the package 100 may include a transducing substrate or transducing element 102 also known as a transducer that is configured to transduce one or more of a strain, a bending, a force, a torque, a pressure, a temperature, a dilatation, and/or a contraction into one or more signals such as an electric signal (e.g., a voltage or a current), an optical signal, a displacement, and/or a dimension (e.g. a length, an area, a volume, or a shape). The package 100 may further include one or more sensors or sensing elements 104 that are configured to sense the transduced property and to generate analog or digital signals in response to the sensed transduced property, pads 110 or tracks 112, and one or more electronic components, e.g. passive components 106 or active components 108, that are configured to communicate with the sensing elements 104 via at least one of the tracks 112.

As used herein, a transducer or transducing substrate or transducing element is a device that converts a first property in or to a second property. For example, a transducer or transducing substrate or transducing element is a device that converts one form of energy to another. More particularly, a transducer converts a signal in one form of energy to a signal in another form of energy. For example, a mechanical transducer converts a first mechanical property into a second different mechanical or a non-mechanical property, or vice versa. For example, a resistance strain gauge may convert strain or lengthening into an electric signal, a membrane may convert pressure variations into mechanical movement, a solid plate may convert a force signal, a torque signal, or a bending signal into a displacement, a lengthening, a contraction, a bending, etc. A non-mechanical transducer may convert a first non-mechanical property into a second non-mechanical property. For example, a thermocouple converts a temperature signal into an electric signal, etc.

As used herein, a passive component is a component that does not require an electrical power source in order to perform their intended function; e.g., batteries, resistors, capacitors, inductors, antennas, transformers, etc. Generally, passive components can store or maintain energy in the form of voltage or current, but cannot add energy to a system.

As used herein, an active component is a component that requires an electrical power source in order to modify an electrical input signal and/or generate an electrical output signal (e.g., amplifier, such as a pre-amplifier, analog-to-digital converter, processor, microprocessor, vacuum tubes) and may or may not comprise semiconductors. The power source may be a separate part that has flexible electrical connections to the electronics package 100. In another embodiment, the power source may be fixedly connected to the transducing element 102 by rigid connections. In one embodiment, the power source may be connected to the transducing element 102 without any flexible connection. Active components often have the ability to electrically control electron flow in a circuit to amplify, convert analog signals to digital signals, correct, average, or otherwise process the signal that is communicated by the sensing element 104. Active devices can also add power to a circuit.

It should be noted that a "fixed" connection effectively integrates two or more components into a single unit, which prevents relative motion between the two connected components. This is in contrast to a flexible connection which allows relative movement between the two connected bodies.

In a conventional manner, the pads 110 are terminals at which electrical or optical connections can be made and the tracks 112 act as electrical or optical carriers between two or more points. Electronic components may be bare die components or packaged components which are included in a housing such as a plastic, elastomer, or metal housing configured to mechanically protect the components, to hydraulically seal the components, to transfer heat from or to the components, and/or to at least partially electrically isolate the components within the housing.

The package 100 may be formed by integrating at least one of the sensing element 104, the pads 110 and the tracks 112 onto the transducing substrate or transducing element 102 by the process of depositing layers, e.g. thin films of insulating and conducting materials. Sputtering is a commonly known technology that may be utilized to create layers on the transducing element 102. Elements like tracks, pads, or sensing elements may be created by sputtering if combined with masking or subtractive manufacturing such as etching, grinding or laser irradiation. Alternatively, layers may be also created by 3D printing. In this arrangement, the passive and/or active electronic components 106, 108 as well as a power source may be fixedly connected by one or more of adhesive attachment, by welding, by soldering, by bonding, or by any type of mechanical fixture such as screws, nuts, clamps, etc.

In one arrangement, the FIG. 2 embodiment may use a "coin" or disk shaped metallic substrate for the transducing substrate or transducing element 102. A sensing element 104, for example, a strain gauge sensor may be positioned over a thinned down section of the transducing substrate 102. Using a metallic substrate 102 allows the connection of the transducing substrate 102 to the drilling system 10 of FIG. 1 close enough so that the strain sensed by the strain gauge corresponds to the strain of the drilling system 10 of FIG. 1. To ensure the close connection of the transducing element 102 to the drilling system 10 of FIG. 1, the transducing element 102 needs have a strong enough physical connection so that the metallic transducing substrate 102 can withstand the vibrations without breaking. For example, a strain gauge sensor 104 may be a sputtered sensor that is connected to sputtered pads 110. As a further example, the strain gauge sensor 104 may utilize a bridge configuration to sense the deformation of the transducing substrate 102. The electronic component 108 may be a pre-amplifier along with a temperature sensor (not shown) and may be arranged around the central sensing structure and attached by soldering directly onto sputtered pads 110. The temperature sensor may be utilized to correct for temperature effects of the transducing substrate 102 and/or the strain gauge sensor 104.

While the foregoing is discussed with respect to a strain sensing element, it should be understood that other sensors are also possible within the scope of this disclosure. For instance, the sensor 104 may also comprise an inertia sensing element. For example, the sensor 104 may comprise an accelerometer or a gyrometer. Other sensors may include a temperature sensor, an acoustic sensor such as an acoustic wave sensor, a dimension sensor such as a displacement sensor, a length sensor, a dilatation, a contraction sensor, a bending sensor, a force sensor, a torque sensor, and a pressure sensor. Accordingly, the transducing substrate 102 may be selected to transduce the signal in the first form of energy to the corresponding second form of energy that the sensor 104 is configured to sense.

Figure 3:
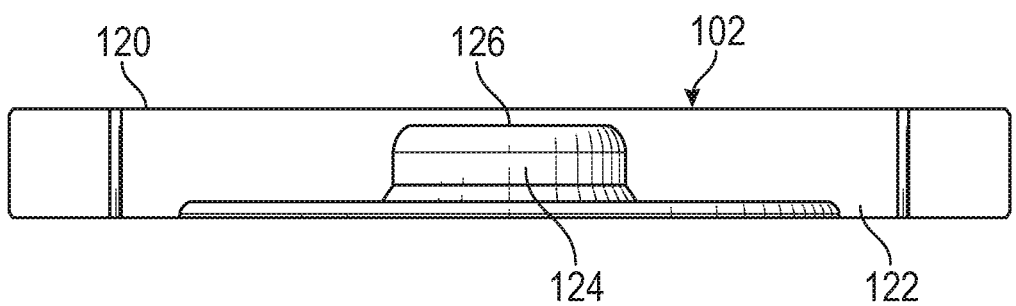
FIG. 3 illustrates a substrate according to one embodiment of the present disclosure.

Referring to FIG. 3, there is another non-limiting embodiment of a substrate 102 that is suitable for a package configured to estimate torque and/or axial loadings. The transducing element or substrate 102 may be formed as a disk having an upper surface 120 and a lower surface 122. In some embodiments, a cavity 124 may be formed on the lower surface 122 in order to make the substrate 102 more responsive to flexure. In particular, a wall defining the cavity 124 may be thinned to form a membrane 126 on which the sensing element 104 may be formed. Generally, for applications to estimate physical loadings, the substrate 102 should be sufficiently elastically deformable to react in a predetermined way as adjacent structures move, bend, stretch, or twist in response to applied loadings. Thus, the sensor 104 deposited (e.g. sputtered) or otherwise fixedly connected to the substrate 102 can detect and generate signals representative of such physical deformations. The substrate 102 may be formed of metals, non-metals, ceramics, composites, or any other suitable materials or combination of materials. Fixedly connecting the sensor 104 to the substrate 102 enables the electronics package to be provided as an integral assembly that requires minimized space. In one embodiment, the sensor 104 is fixedly connected to the substrate 102 without any flexible connection. The substrate may be part of one of the downhole tools that are discussed above with respect to FIG. 1.

Figure 4:
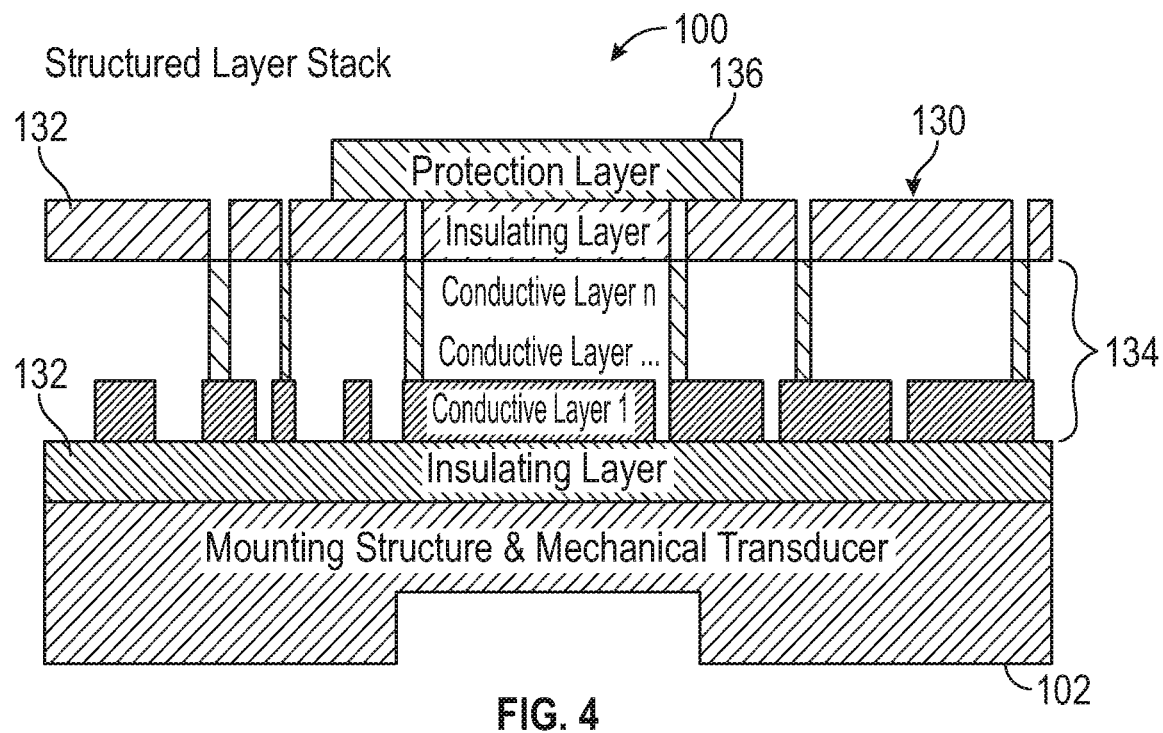
FIG. 4 illustrates layers forming a sensing element, tracks, and pads deposited on a transducing substrate according to one embodiment of the present disclosure.

Referring to FIG. 4, there is schematically shown one arrangement for forming an integrated electronics layer for the package 100. In this embodiment, the package 100 includes a plurality of layers 130 over the transducing element or transducer substrate 102. The layers 130 may include one or more electrically insulating layers 132, one or more electrically conductive layers 134, and one or more protection layers 136 formed using known thin-film deposition processes such as sputtering. It should be noted that the sensing element 104, pads 110, and tracks 112 may be structurally integrated and formed effectively in separate processes or within the same structuring process.

It should be understood that the teachings of the present disclosure may be implemented in various configurations. Some non-limiting embodiments are described below with reference to FIGS. 5-7. Each of these embodiments use a transducing element or transducing substrate 102 on which the pads 110 and tracks 112 are defined by a layer deposited on the transducing substrate 102 as discussed above. These embodiments might be used, for example, as a sensor for dynamic related properties such as bending, force, torque, weight, and pressure, or as an acoustic sensor such as a hydrophone. However, each figure illustrates a different possible electrical arrangement.

Figure 5:
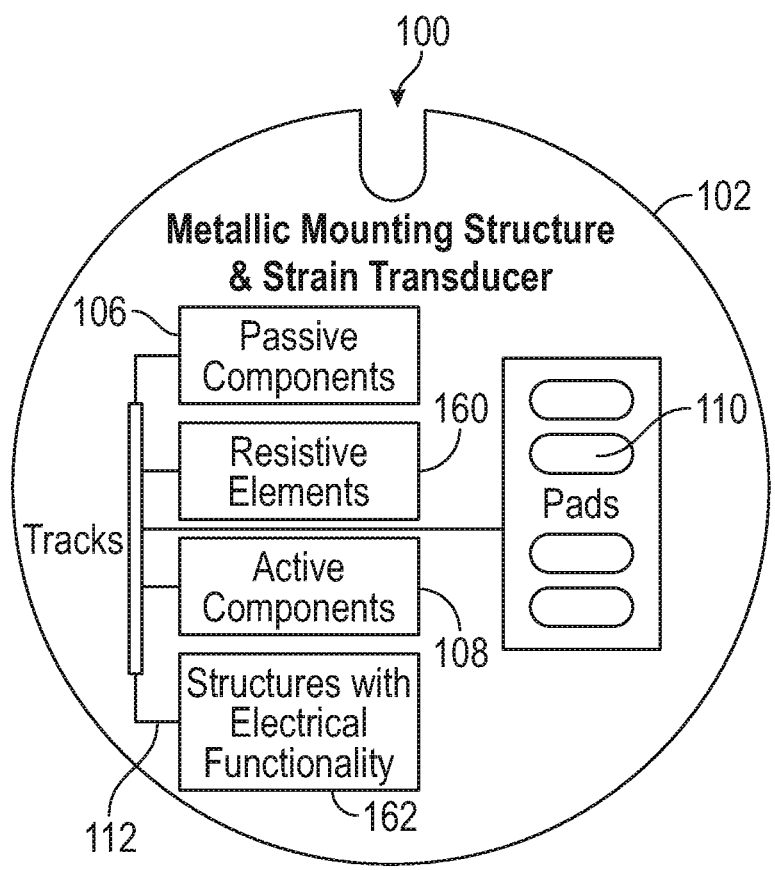
FIG. 5 illustrates one embodiment of an electronics package according to the present disclosure.

FIG. 5 illustrates a package 100 that does not necessarily incorporate a sensing element. This embodiment uses passive components 106, such as resistive elements 160, active components 108, and other structures with electrical or optical functionality 162.

Figure 6:
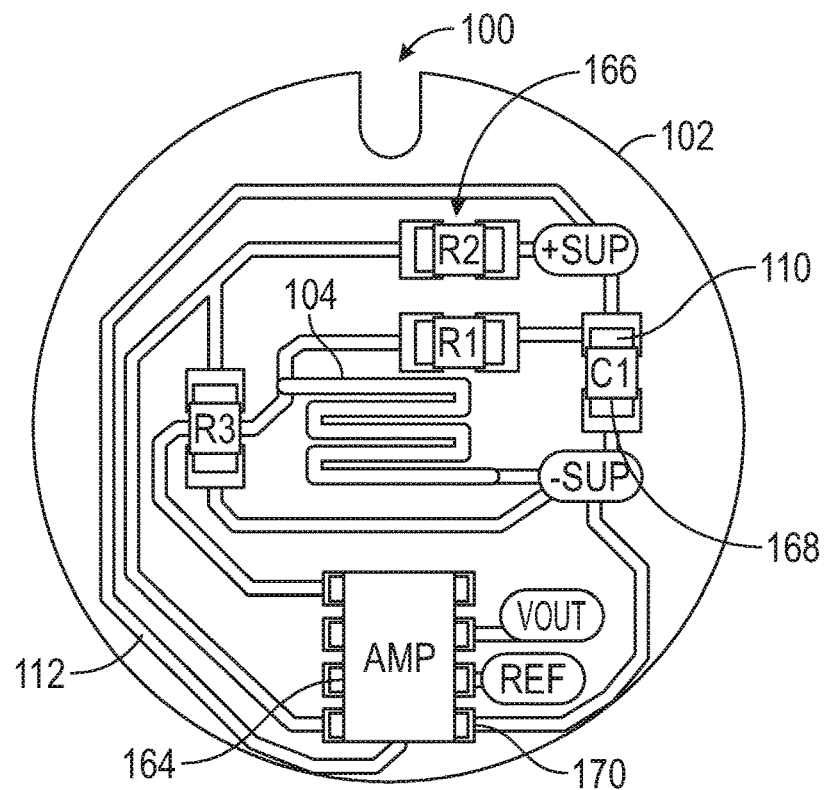
FIG. 6 illustrates one embodiment of an electronics package that includes housed components according to the present disclosure.

FIG. 6 illustrates a package 100 that includes a housed component 164 that may include an active electronic component (e.g., amplification circuitry), a sensor 104, for example a strain sensor or a piezoelectric crystal, sensing the signal from the transducing substrate 102, and a passive electronic component such as resistive circuitry 166 or capacitor 168 and an active electronic component such as an amplifier 164. In this embodiment, the connections, e.g., the connections 170 for the housed component 164, use adhesives and/or solders. Other embodiments might include welded or sintered connections or any type of wire bond. It should be noted that the amplification circuitry in the housed component 164 can be readily located close to the sensor 104 that is in close contact to the transducing substrate 102 to minimize problems that may occur when weak sensor signals are present.

Figure 7:
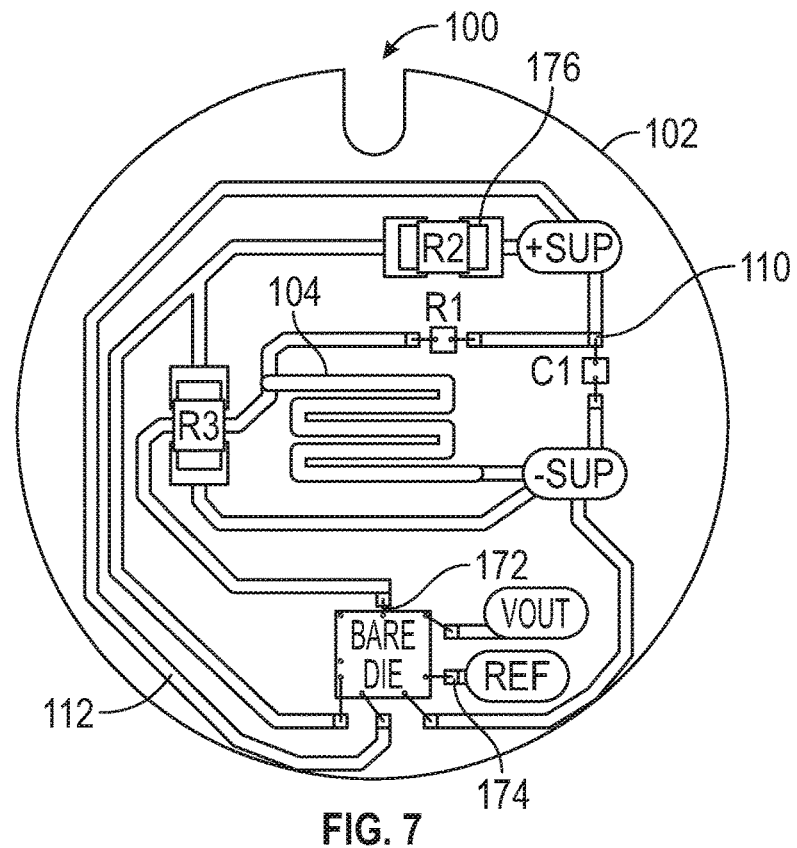
FIG. 7 illustrates one embodiment of an electronics package that includes bare die components and wire bondable components as well as adhesive attached components according to the present disclosure.

FIG. 7 illustrates a package 100 that is similar to the FIG. 6 embodiment, but includes a bare die component 172. In this embodiment, there are a combination of wire bonded connections and adhesive/soldered connections. For example, there may be wire bonded connections 174 and adhesive/solder connections 176.

In still another embodiment that is not shown, one or more of a sensor such as a strain sensor, a track, and a pad may be sputtered or otherwise deposited on a metallic substrate to form a sensor module. This sensor module may then be connected to a PCB board or other electronic device using flexible wiring and adhesives/soldering/connectors/clamps or other wire bond techniques.

While the present teachings have been discussed in the context of hydrocarbon producing wells, it should be understood that the present teachings may be applied to geothermal wells, groundwater wells, subsea analysis, etc. Also, any conveyance device, other than a drill string, may be used to convey downhole tools. Exemplary non-limiting conveyance devices include casing pipes, wirelines, wire line sondes, slickline sondes, drop shots, self-propelled tractors etc.

While the foregoing disclosure is directed to the one mode embodiments of the disclosure, various modifications will be apparent to those skilled in the art. For example, while embodiments are shown that use one component, e.g., one sensor, other embodiments may use a plurality of any of or all of the components described above. Thus, it is emphasized that the articles "a" or "the" do not imply that only one of the referenced item is present, but that such articles also encompass two or more of the referenced items. It is intended that all variations be embraced by the foregoing disclosure.

We claim:

1. An apparatus for use in a wellbore, comprising:
   a transducing element configured to transduce a first property into a second property;
   a sensing element fixedly connected to the transducing element and generating a signal in response to the second property;
   an insulating layer and a conductive layer created on the transducing element by sputtering, the insulating layer and the conductive layer defining at least one track; and
   at least one active electronic component fixedly connected to the transducing element and in communication with the sensing element via the at least one track.

2. The apparatus of claim 1, wherein the at least one active electronic component is energized by an electrical power source and is configured to at least one of: (i) modify an electrical input signal, and (ii) generate an electrical output signal.

3. The apparatus of claim 1, wherein the transducing element is a mechanical transducer.

4. The apparatus of claim 3, wherein the transducing element comprises a metallic material.

5. The apparatus of claim 2, wherein the first property is at least one of a strain, a bending, a force, a torque, a pressure.

6. The apparatus of claim 1, wherein the sensing element is fixedly connected to the transducing element by at least one of: (i) sputtering, (ii) adhesive attachment, (iii) welding, (iv) soldering, and (v) bonding.

7. The apparatus of claim 1, wherein the sensing element is one of: (i) an inertia sensing element, (ii) an accelerometer, and (iii) a gyrometer.

8. The apparatus of claim 1, wherein the first property is at least one of a dilatation, a contraction, and a dimension.

9. The apparatus of claim 1, wherein the at least one active electronic component is selected from one of (i) an amplifier, (ii) an analog to digital converter, (iii) a processor, (iv) a bare die component, and (v) a packaged electronic component.

10. The apparatus of claim 1, further comprising a plurality of pads defined by the at least one layer.

11. The apparatus of claim 1, wherein one of the at least one track, the at least one layer, and the sensing element is at least partially formed by sputtering.

12. The apparatus of claim 1, further comprising at least one connection formed on the transducing element, the at least one connection being at least one of: (i) an adhesive connection, (ii) a soldered connection, (iii) a welded connection, (iv) a sintered connection, and (v) a wire bond.

13. A method for using an apparatus in a wellbore, comprising:
forming a downhole tool that includes:
a transducing element configured to transduce a first property into a second property;
a sensing element fixedly connected to the transducing element and generating a signal in response to the second property;
an insulating layer and a conductive layer created on the transducing element by sputtering, the insulating layer and the conductive layer defining at least one track; and
at least one active electronic component fixedly connected to the transducing element and in communication with the sensing element via the at least one track;
conveying the downhole tool into the wellbore; and
operating the downhole tool while in the wellbore.

14. The method of claim 13, further comprising:
energizing the at least one active electronic component by using an electrical power source; and
using the energized at least one electronic component to at least one of: (i) modify an electrical input signal, and (ii) generate an electrical output signal.

15. The method of claim 13, further comprising fixedly connecting the at least one active electronic component to the transducing element by at least one of: (i) sputtering, (ii) adhesive attachment, (iii) welding, (iv) soldering, and (v) bonding.

16. The apparatus of claim 1, wherein the sensing element and the at least one layer are on a same surface of the transducing element.

17. The apparatus of claim 1, wherein the at least one layer is connected to the sensing element and to at least one active electronic component, both connections being on a same surface of the transducing element.

18. The apparatus of claim 1, wherein the at least one layer is formed at least partially of a film deposited on a surface of the transducing element.

19. An apparatus for use in a wellbore, comprising:
a transducing element configured to transduce a first property into a second property;
a sensing element fixedly connected to the transducing element and generating a signal in response to the second property;
an insulating layer and a conductive layer created on the transducing element by 3D printing, the insulating layer and the conductive layer defining at least one track; and
at least one active electronic component fixedly connected to the transducing element and in communication with the sensing element via the at least one track.

20. A method for using an apparatus in a wellbore, comprising:
forming a downhole tool that includes:
a transducing element configured to transduce a first property into a second property;
a sensing element fixedly connected to the transducing element and generating a signal in response to the second property;
an insulating layer and a conductive layer created on the transducing element by 3D printing, the insulating layer and the conductive layer defining at least one track; and
at least one active electronic component fixedly connected to the transducing element and in communication with the sensing element via the at least one track;
conveying the downhole tool into the wellbore; and
operating the downhole tool while in the wellbore.

* * * * *

UNITED STATES PATENT AND TRADEMARK OFFICE
CERTIFICATE OF CORRECTION

PATENT NO.        : 10,725,202 B2
APPLICATION NO.   : 15/656851
DATED             : July 28, 2020
INVENTOR(S)       : Christian Wille et al.

Page 1 of 1

It is certified that error appears in the above-identified patent and that said Letters Patent is hereby corrected as shown below:

In the Claims

In Claim 10, at Column 7, Line 15, please delete "the at least one layer" and insert -- at least one of the insulating layer and the conductive layer --.

In Claim 11, at Column 7, Line 17, please delete "at least one layer" and insert -- insulating layer, the conductive layer --.

In Claim 14, at Column 7, Line 42, after "one", please insert -- active --.

In Claim 16, at Column 8, Line 7, please delete "the at least one layer" and insert -- at least one of the insulating layer and the conductive layer --.

In Claim 17, at Column 8, Line 9, please delete "the at least one layer" and insert -- at least one of the insulating layer and the conductive layer --.

In Claim 17, at Column 8, Line 10, after "element and to" please insert -- the --.

In Claim 18, at Column 8, Line 13, please delete "the at least one layer" and insert -- at least one of the insulating layer and the conductive layer --.

Signed and Sealed this
Sixth Day of October, 2020

Andrei Iancu
*Director of the United States Patent and Trademark Office*